(12) United States Patent
Trembone et al.

(10) Patent No.: US 7,124,535 B2
(45) Date of Patent: Oct. 24, 2006

(54) LIGHTED FISH HOOKS

(75) Inventors: Joseph Trembone, Bedford Corners, NY (US); Scott A. Teal, Wappingers Falls, NY (US)

(73) Assignee: Tealbone, Inc., Bedford Corners, NY (US)

( * ) Notice: Subject to any disclaimer, the term of this patent is extended or adjusted under 35 U.S.C. 154(b) by 0 days.

(21) Appl. No.: 11/097,564

(22) Filed: Apr. 1, 2005

(65) Prior Publication Data

US 2005/0279007 A1   Dec. 22, 2005

Related U.S. Application Data

(63) Continuation-in-part of application No. 10/966,975, filed on Oct. 16, 2004, now abandoned.

(51) Int. Cl.
*A01K 85/01* (2006.01)

(52) U.S. Cl. ........................................... 43/17.6

(58) Field of Classification Search ............ 43/17, 43/17.6, 17.5

See application file for complete search history.

(56) References Cited

U.S. PATENT DOCUMENTS

| | | | | |
|---|---|---|---|---|
| 3,863,380 A * | 2/1975 | Purlia | ............ | 43/17.6 |
| 3,940,868 A * | 3/1976 | Northcutt | ............ | 43/17.6 |
| 4,658,531 A * | 4/1987 | Morimoto | ............ | 43/17 |
| 4,757,632 A * | 7/1988 | Grobl | ............ | 43/17.6 |
| 4,799,327 A * | 1/1989 | Treon | ............ | 43/17.6 |
| 5,495,690 A | 3/1996 | Hunt | | |
| 6,079,144 A * | 6/2000 | Morgan et al. | ............ | 43/17.6 |
| 6,318,016 B1 | 11/2001 | Ellig | | |
| 6,336,288 B1 * | 1/2002 | Foss | ............ | 43/17.6 |
| 6,546,666 B1 * | 4/2003 | Schultz et al. | ............ | 43/17.6 |
| 6,796,077 B1 * | 9/2004 | Dupree et al. | ............ | 43/17.6 |

* cited by examiner

*Primary Examiner*—Teri Pham Luu
*Assistant Examiner*—Susan C. Alimenti
(74) *Attorney, Agent, or Firm*—Milde & Hffberg, LLP

(57) ABSTRACT

An illuminated fish hook has a self-contained lithium polymer battery and light unit, preferably an LED, permanently attached thereto. The light unit is provided with an on/off switch. In an alternative embodiment the light unit is inserted directly, or a capsule containing the light unit is inserted, in a translucent fish lure.

4 Claims, 6 Drawing Sheets

LIGHTED FISH HOOKS

CROSS-REFERENCE TO RELATED APPLICATION

This application is a continuation-in-part application of U.S. patent application Ser. No. 10/966,975, filed Oct. 16, 2004 now abandoned, entitled "LIGHTED FISH HOOKS".

FIELD OF THE INVENTION

The present invention relates to lighted or illuminated fishing tackle.

BACKGROUND OF THE INVENTION

Traditionally, lights have been used by fishermen to accomplish two purposes. For night fishing, lights have been attached to the bobber so that the fishermen could see when there was a hit on the line. For example, the Nite Brite™ lighted float utilizes a replaceable lithium polymer battery/LED light.

In addition, lights and luminous means have been used in conjunction with hooks and lures to attract fish especially in turbid or low light water conditions. U.S. Pat. No. 3,940,868 to Northcutt discloses a fishing lure with a light source mounted to the shank of the hook. The light source, an LED, is attached to a power source which is separately mounted, on the fishing line. Such a construction requires the separate mounting of the power source, a step which is inconvenient for the fisherman. In addition, attaching the battery to the line may cause fraying, crimping or damage to the line, which might increase the risk of line breakage. This is especially important when fishing for large trophy fish which may apply stress on line which approaches the maximum load that the line can withstand.

U.S. Pat. No. 5,495,690 to Hunt describes an electronic lure having a light source which is mounted to the shank of the hook. The lighted lure of Hunt also requires a mounting plate for the battery, and biasing means to hold the battery to the mounting plate, both of which are provided on the shank of the hook. The battery mounting plate dictates the shape of lure, and has nothing to do with attractiveness to fish. In addition, the mounting plate prevents use of the hook with a wide variety of bait, and especially with artificial plastic bait having a preformed channel therethrough, for stringing the bait along the shank of the hook. The fishermen is required to assemble the battery with the light source before commencing fishing.

U.S. Pat. No. 6,318,016 to Ellig describes a luminous fishing lure using a fiber-optic tube comprising a fluorescent dye polymer to simulate the lateral line of a bait fish and/or a luminous fish eye. The fluorescent light polymer requires a natural light source and hence is of limited usefulness at night or in turbid or other low light water conditions.

SUMMARY OF THE INVENTION

It is an object to present invention to provide a superior fish hook having illumination to attract greater numbers of fish, in a wide variety of situations, especially low natural light circumstances.

It is a further object of the present invention to provide an illuminated hook which requires no assembly, and can be used immediately upon attaching the hook to the line.

It is a further object of the present invention to provide an illuminated fish hook in any basic hook design, which does not alter the profile of the basic hook, permitting it to be used with all the existing tackle for the basic hook, including artificial bait.

It is a further object of the present invention to provide an illuminated fish hook which does not require the user to attach a battery to the hook or the line.

It is a further object of the present invention to provide an illuminated hook capable of many hours of illumination, so that the fishermen need not be concerned with turning the hook light on or off.

It is a further object of the present invention to provide an illuminated hook for the fisherman who likes to use live bait, providing him with a hook with a degree of attraction not previously available.

It is a further object of the invention to provide an attachment for a fishing lure which serves as an additional attraction to fish due to its illumination and/or noise.

These objects, as well as other objects which will become apparent from the discussion that follows, are achieved, in accordance with one aspect of the present invention, which comprises an illuminated fish hook comprising a shaft, with a curved hook at one end, and a line connector that the other end, and an LED with a battery attached to the shaft of the hook. The illuminated fish hook may further comprise a switch, to turn the LED on and/or off. The LED with battery may be attached to the shaft by any conventional means such as soldering or gluing, through the use of pressure clips. The illuminated fish hook may further comprise a head attached to the shaft at the line connector end.

The illuminated fish hook of the present invention may be constructed with a hook of any shape or design, including a hook intended to be strung through preformed channels in artificial bait.

In an illuminated Keeper Hook, if desired, the light (with battery) may be attached to the keeper rod rather than the shaft.

In accordance with another aspect of the present invention, a separate capsule is provided for attachment to a fishing lure for holding an LED/battery unit in watertight fashion. The capsule comprises a clear plastic elongate cylinder, closed at one end and open at the other, and a removable cap for covering the open end of the cylinder in a watertight manner.

In use, an LED/battery unit may be switched on and then inserted into the capsule just prior to use. Advantageously, a noise maker, such as a plurality of pellets or an electronic noise generator with a battery, may also be inserted into the capsule as an additional attraction to fish, and the capsules then sealed by placing the cap on the open end. Thereafter, the capsule may be inserted by the fisherman into the body of a rubber fish for use as a lure. To receive the capsule, the back of the rubber fish may be provided with a hollowed out slit to accept and hold the capsule.

After use in a fishing lure, the capsule may be removed from the rubber fish, its cap unsealed and the LED/battery unit removed and switched off for future use.

For a full understanding of the present invention, reference should now be made to the following detailed description of the preferred embodiments of the invention as illustrated in the accompanying drawings.

DESCRIPTION OF THE PREFERRED EMBODIMENTS

Figure 1A:
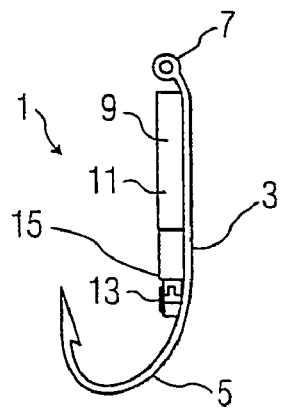
FIG. 1A is a side plan view of an illuminated fish hook of the present invention constructed from a simple hook.

The preferred embodiments of the present invention will now be described with reference to FIGS. 1A to 12 of the drawings. Identical elements in the various figures are designated with the same reference numerals.

Figure 1B:
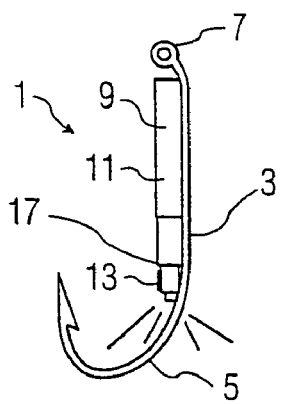
FIG. 1B is a side plan view of the illuminated fish hook of FIG. 1A, with the switch engaged and the light illuminated.

As seen in FIG. 1A, the illuminated fish hook of the present invention does not significantly change the profile of the existing hook to which it is added. In this embodiment, that basic hook is a simple standard hook. The illuminated fish hook of the present invention is shown generally at 1. It comprises a shaft, 3, at one end of which is a line connector; in this instance the ring, 7; and at the other end of which is the barbed hook, 5. As shown, a self-contained battery light unit, 9, is permanently attached to the shaft of hook. The unit, 9, comprises a battery, 11, and a light source; in this instance, LED, 13. In this preferred embodiment the unit has a push-pull, on-off switch, 15. In an alternative construction, the on/off switch may be located along the length of the battery, and may be a push-on, push-off switch. As shown at 15 in FIG. 1A, the switch is open and the light is off. In FIG. 1B, the light source, 13, has been pushed in, towards the battery, closing the switch, as shown at 17, and turning on the light. In this preferred embodiment, the LED is powered by a lithium three volt battery.

In constructing the illuminated hook of the present invention, the self-contained battery light unit used is made in Korea by Mirae Battery and sold in the United States by Lindy, under the name Nite Brite™, as a replacement battery for a lighted float bobber. This "replacement unit" comes in three sizes: R-316(3×16 mm), R-327(3×27 mm), and R-435 (4×35 mm), and is easily attached to the shaft of the hook by any known means such as soldering or gluing. The lights come in a number of colors, such as green, orange and red. The different color lights provide fishermen with an array of color combinations simply by changing the color of the soft rubber baits. This particular battery light unit is inexpensive and has a battery life of 20 hours. Thus the fisherman is not pressed to turn the light off to preserve the battery life. In alternative embodiments, the light source and battery need not be a self-contained unit. It is only required that both the light source and the battery be attached to the hook. While the light source in the preferred embodiment may be switched off, it is only necessary that the light unit have means for turning the light source on.

Figure 2A:
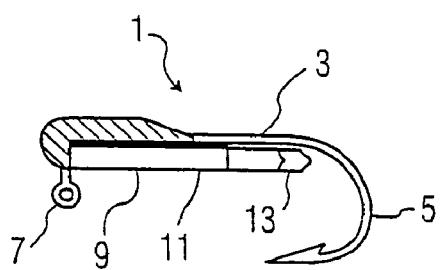
FIG. 2A is a side plan view of an illuminated tube jig head hook according to the present invention.

FIG. 2A illustrates an illuminated tube head jig head hook. As in the FIGS. 1A and 1B, the battery light unit is attached to the shaft of the hook along the inside of the hook, with a light source disposed towards the hook end of the shaft. It is understood to that the unit may be attached at any portion of the surface of the shaft, and that the light source may be disposed toward the line connector end a shaft, and still achieve many of the benefits of the present invention.

Figure 2B:
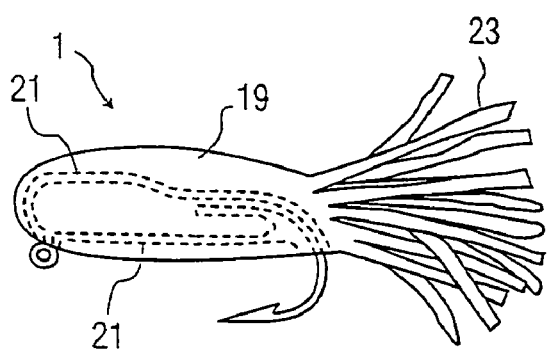
FIG. 2B is a side plan view of the hook of FIG. 2A, disposed through the preformed channel of a plastic tube tail skirt.

FIG. 2B illustrates the illuminated hook of FIG. 2A, disposed through the preformed channel, 21, of an artificial tube tail bait, 19, such as those conventionally made of "wiggly" rubber. This particular artificial bait fish includes than a number of movable parts, 23, resembling the tail of the natural fish it is meant to mimic.

Because of the slicing action of the barbed hook, and the shape and disposition of the battery light unit along the shaft, this hook may be easily inserted into an artificial bait fish without a preformed channel. Similarly, this hook may be easily used with live bait, as the addition of the light battery unit does not substantially alter the profile of the hook. However, the addition of the bright, long-lasting light source provides a tremendous improvement for attracting fish, especially while using the keeper style hook embodiment.

Figure 3A:
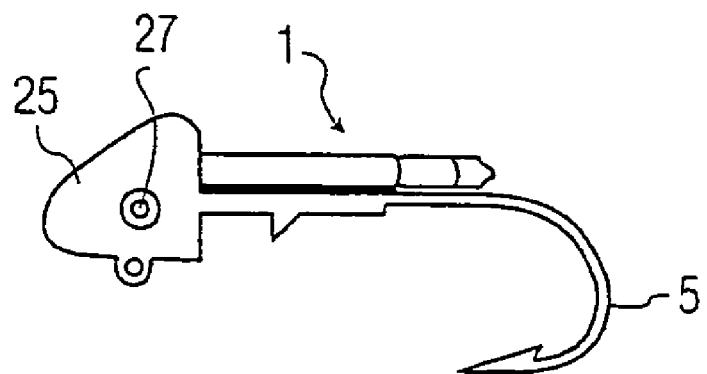
FIG. 3A is a side view of and illuminated shad head jig head hook according to the present invention.
Figure 3B:
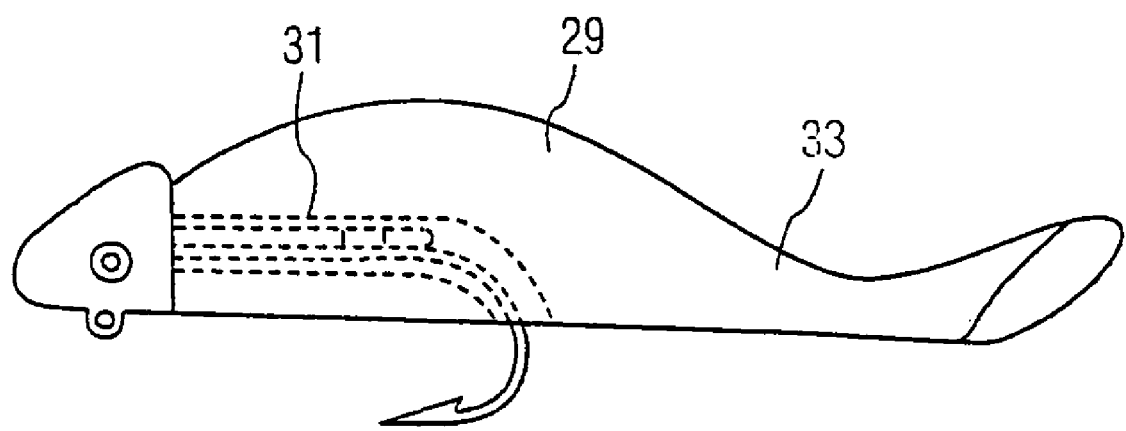
FIG. 3B is a side of view and of the hook of FIG. 3A disposed through a preformed channel of a plastic shad body.

FIG. 3A illustrates an illuminated fish hook according to the present invention, formed with a shad head jig head hook. As shown, shad head jig head hook has a head portion, 25, with an eye, 27, to increase its attractiveness to fish. In this preferred embodiment the self-contained battery light unit is easily accommodated along the outer surface of the shaft of the hook. Because the unit so closely parallels the shaft, this illuminated hook may be used with substantially any piece of soft tackle that may be used with a simple shad head jig head hook. For instance, in FIG. 3B, the hook is shown disposed through the preformed channel, 31, of an artificial bait fish, 29, with flexible tail, 33.

In fact, the illuminated fish hook of the present invention may be formed with many configurations of fish hooks, such as Aberdeen hooks, bait holder hooks, weighted hooks, weedless hooks, offset hooks, trailer hooks, treble hooks, Keeper Hooks, snelled hooks, and fly hooks for fly fishing. In addition, illuminated fish hooks of the present invention may be easily constructed in many jig type configurations, such as round jig heads, football jig heads, bullet jig heads, cross eyed jig heads, tube head jig heads, stand up jig heads, floating jig heads and shad jig heads. The hooks can be used with just about any soft bait, such as worms, trailers, grubs, craws, lizards, jerk baits and tubes. Universally, with any hook design, and with any bait, the illuminated fish hook of the present invention will attract and catch more fish, especially in turbid or low light water conditions.

Figure 4A:
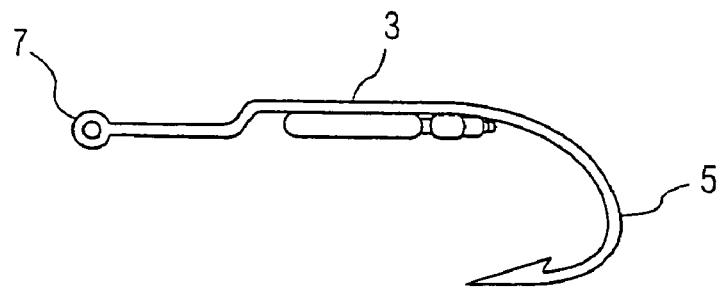
FIG. 4A is a side view of an illuminated offset worm hook according to the present invention.
Figure 4B:
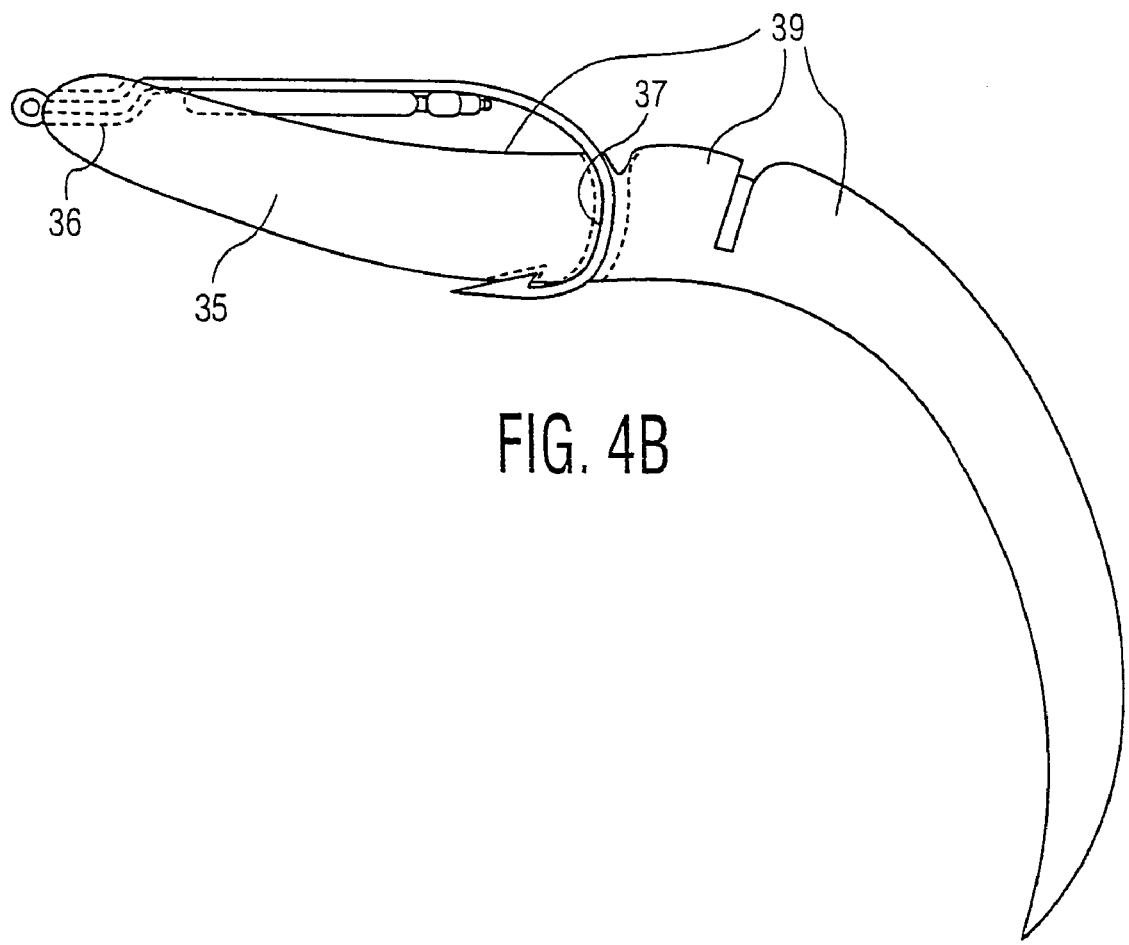
FIG. 4B is a side view of the hook of FIG. 4A, with the line connector end disposed through one end of a large rubber slug-go stickbait, and the hook disposed through the body of the rubber stickbait.

FIG. 4A illustrates an illuminated offset worm hook according to the present invention. In this preferred construction the self-contained battery light unit is attached to the inside surface of the shaft, as shown. As seen in FIG. 4B this hook may be used in conjunction with a SLUG-GO artificial stickbait eel or rubber worm, 35. The SLUG-GO has two preformed channels, 36 and 37, for the line connector end of the shaft, and the hook, thereby stringing a portion of the body of bait along the length of the shaft. The long body is formed a flexible material, so that its movement in the water will mimic that of the corresponding live bait. In addition to body has been formed in segments, 39, to add twists, or jerks, mimicking the propelling motion of the corresponding live bait.

Figure 5:
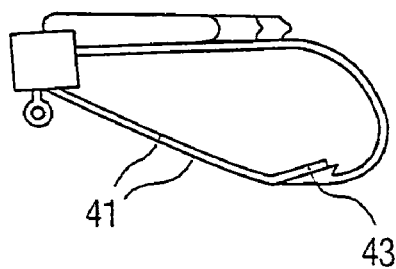
FIG. 5 is a side view of an illuminated "weedless" hook according to the present invention.

FIG. 5 illustrates the illuminated weedless hook of the present invention. A wire strand, 41, extends from the line connector end of the shaft across to the barbed hook, forms a loop, 43, around the hook, and extends back to, and is attached near the line connector end shaft. The wire is tensioned against the hook, but the loop is easily pushed in, and easily released from the hook, opening up the hook for the fish. Thus the tensioned wires prevent snagging the hook on weeds, but allow it to hook the fish. As may be seen in FIG. 5, the self-contained battery light unit may be easily disposed along the outside surface of the shaft, without disturbing the action and function of the wires of the weedless hook.

Figure 6:
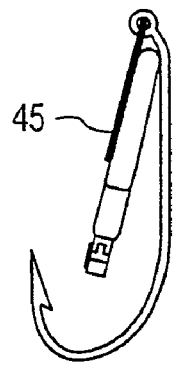
FIG. 6 is a side view of an illuminated keeper style hook according the present invention.

FIG. 6 illustrates an illuminated keeper type hook according to the present invention. As shown, the self-contained battery like unit is attached along the keeper rod, 45. In an alternative construction, the unit may be secured along the shaft of the hook, however, in the construction shown the light can be inserted into the head of virtually any softbait available, such as, worms, craws, grubs, lizards, etc., increasing the attractiveness of the bait to the fish. In fact, in the construction shown, it may not be necessary to add any other bait or attraction to the keeper rod of the hook.

Figure 7:
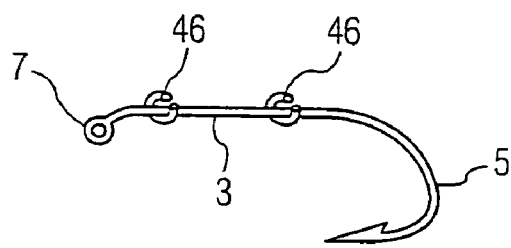
FIG. 7 is a perspective view of a trailer hook with light attachment means.

FIG. 7 illustrates a trailer hook with the means, 46, for attaching a self-contained battery light unit to the shaft. In the particular embodiment shown the means comprise flexible fastening clips which may be constructed of either metal or plastic, each snap on fastening dip comprising two opposed, arcuate, flexible legs. The self-contained battery light unit can be pushed through the two legs, which separate to receive the unit, but snap back to retain it. Two snap on fastenings are shown, to accommodate the front of the back ends of the battery unit, to firmly secure to the shaft of the hook. With this particular embodiment if the self-contained battery light unit used with the hook needs to be replaced the used battery light unit can be snapped and a new battery light unit can be snapped in.

Figure 8:
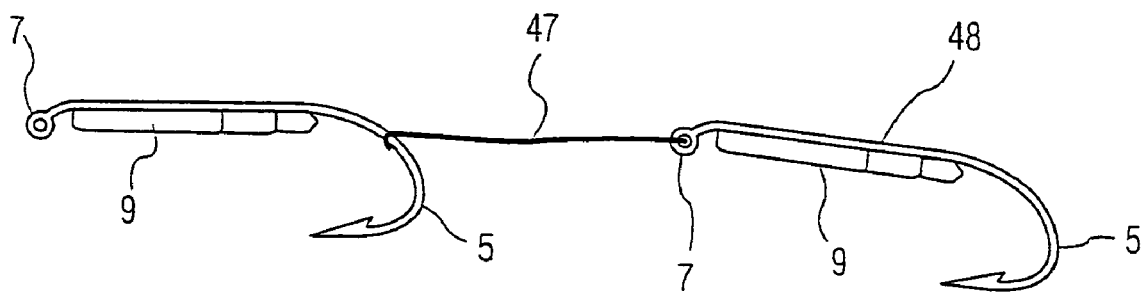
FIG. 8 is a side view of a double hook arrangement.

FIG. 8 illustrates a double hook arrangement in which a wire, 47, is used to connect the hooks, each with a self-contained battery light unit. Such an arrangement may be required for the larger and longer rubber bait. The trailing hook can be threaded through the rubber bait, emerging at the other end so it is available to catch the fish.

Figure 9:
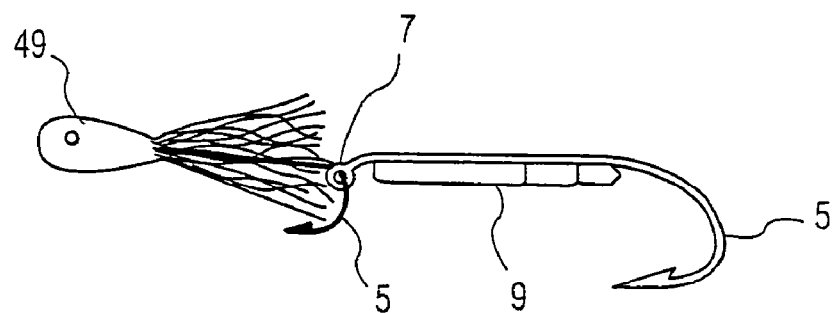
FIG. 9 is a side view of a trailer hook arrangement.

FIG. 9 illustrates a trailer hook arrangement of fish hooks, comprising a shad lure, 49, having a hook, 5, which has been passed through the line connector, 7, of another hook having a self-contained battery light unit according to the present invention, in the embodiment shown, a trailer hook.

Figure 10:
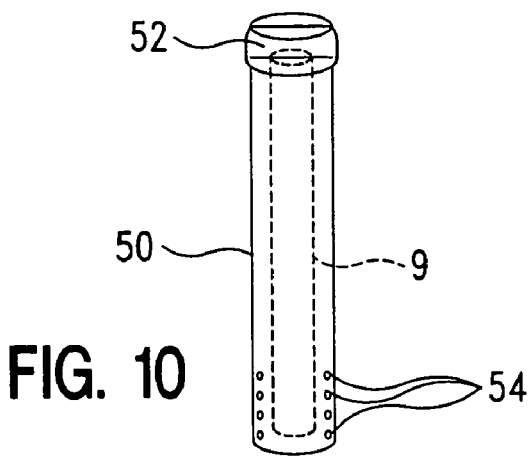
FIG. 10 is a side view of a clear plastic capsule with a watertight cap for holding an LED/battery unit and/or a noise producing device for attracting fish.

According to another aspect of the present invention, the self-contained battery light unit 9 is installed in a watertight, clear plastic capsule which, in turn, is inserted in the body of a translucent rubber fish that serves as a lure. This capsule protects the LED/battery light unit against the hostile water environment and protects the environment against the LED/battery unit which may contain lithium. The capsule consists of a clear plastic cylindrical tube 50, closed at one end and provided with a watertight cap 52 at the opposite end, as shown in FIG. 10. The cap may be either screwed on or snapped onto the capsule cylinder. The only requirement is that it be substantially watertight.

The capsule is preferably made large enough to hold not only the LED/battery unit, but also a plurality of small pellets, such as No. 9 steel pellets. These pellets can serve not only as a weight but also to create a small noise when they knock about within the capsule, serving as an attraction to fish.

Figure 11:
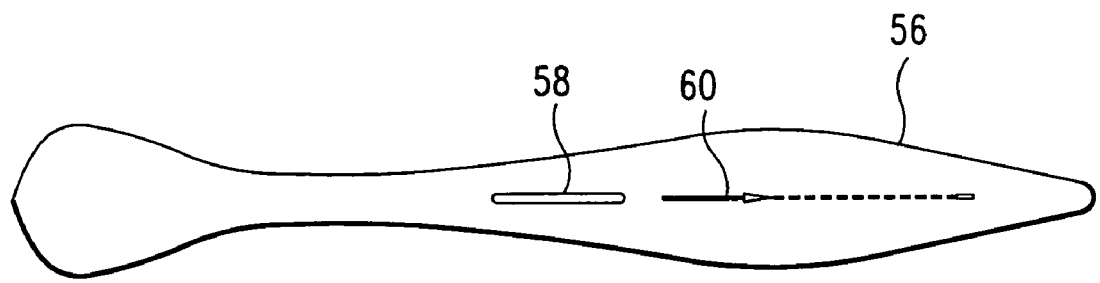
FIG. 11 is a side view of a fishing lure with a translucent rubber fish having the capsule of FIG. 10 embedded therein.
Figure 12:
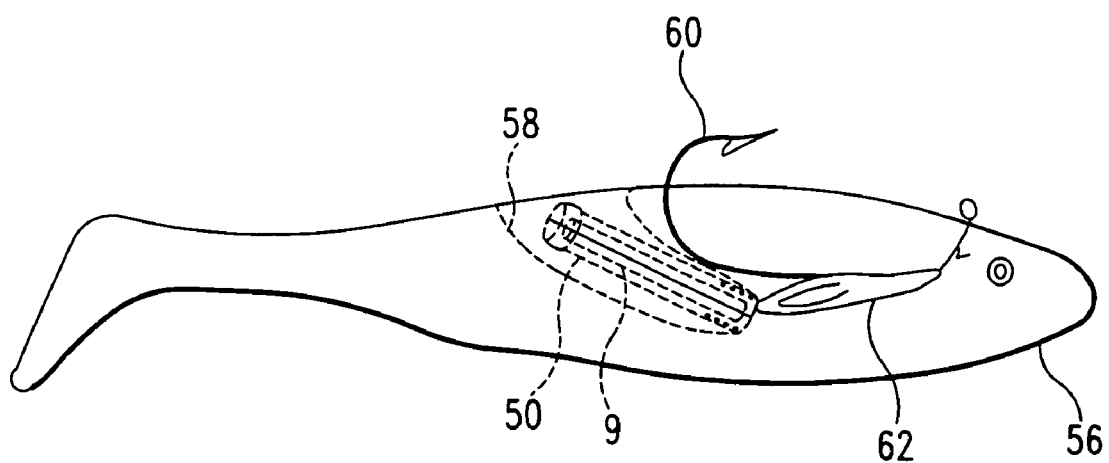
FIG. 12 is a top view of the fishing lure of FIG. 11 showing a slit for insertion of the capsule of FIG. 10.

The capsule 50, with the LED/battery unit 9 and the pellets 54, is designed to be installed in a translucent rubber lure 56. As shown in FIGS. 11 and 12, the capsule is installed in a pocket 58 which is accessible through a slit in the back of the lure. FIG. 11 shows this pocket 58 in dashed lines.

In addition, the lure is provided with a pre-molded hook 60 with a metal weight 62.

In operation, the fisherman switches on the LED/battery light unit 9 and inserts it into the capsule cylinder 50. After doing so, he may also insert a plurality of pellets 54 into the capsule surrounding the light unit. Thereafter, the cap 52 is securely snapped or screwed onto the open end of the cylinder and the capsule is inserted into the pocket 58 in the rubber fish 56. The lure, with the fish 56, capsule 50 and hook 60 is now ready for use.

After fishing, the fisherman can remove the capsule 50 from the fish 56, open the cap and remove the light unit 9. The light unit may then be switched off and stored together with the fisherman's gear for future use.

There has thus been shown and described a novel lighted fish hook which fulfills all the objects and advantages sought therefore. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An illuminated fish hook comprising:
   (a) a hook comprising a substantially straight shaft with a curved hook at one end and a line connector at the other end, and
   (b) a self-contained light unit, rigidly attached to the shaft and comprising an elongate tubular housing having a diameter in the range of 3 to 4 mm encapsulating a battery and having an LED light source disposed at one end, said housing extending substantially parallel to said shaft between the line connector and the curved hook and entirely on the same side of the shaft as the curved hook with the light source facing toward the hook, said light source including a push-on pull-off switch, formed in part by said LED, to turn said light source on and off.

2. The illuminated fish hook of claim 1, wherein the light unit is soldered to the shaft.

3. The illuminated fish hook of claim 1, wherein the light unit is glued or epoxyed to the shaft.

4. The illuminated fish hook of claim 1, further comprising a substantially straight keeper rod attached to the shaft near the line connector.

\* \* \* \* \*